Aug. 13, 1929. A. R. K. DJURSON 1,724,795
GUIDING MEANS FOR BRAKE SHOES
Filed Aug. 15, 1928
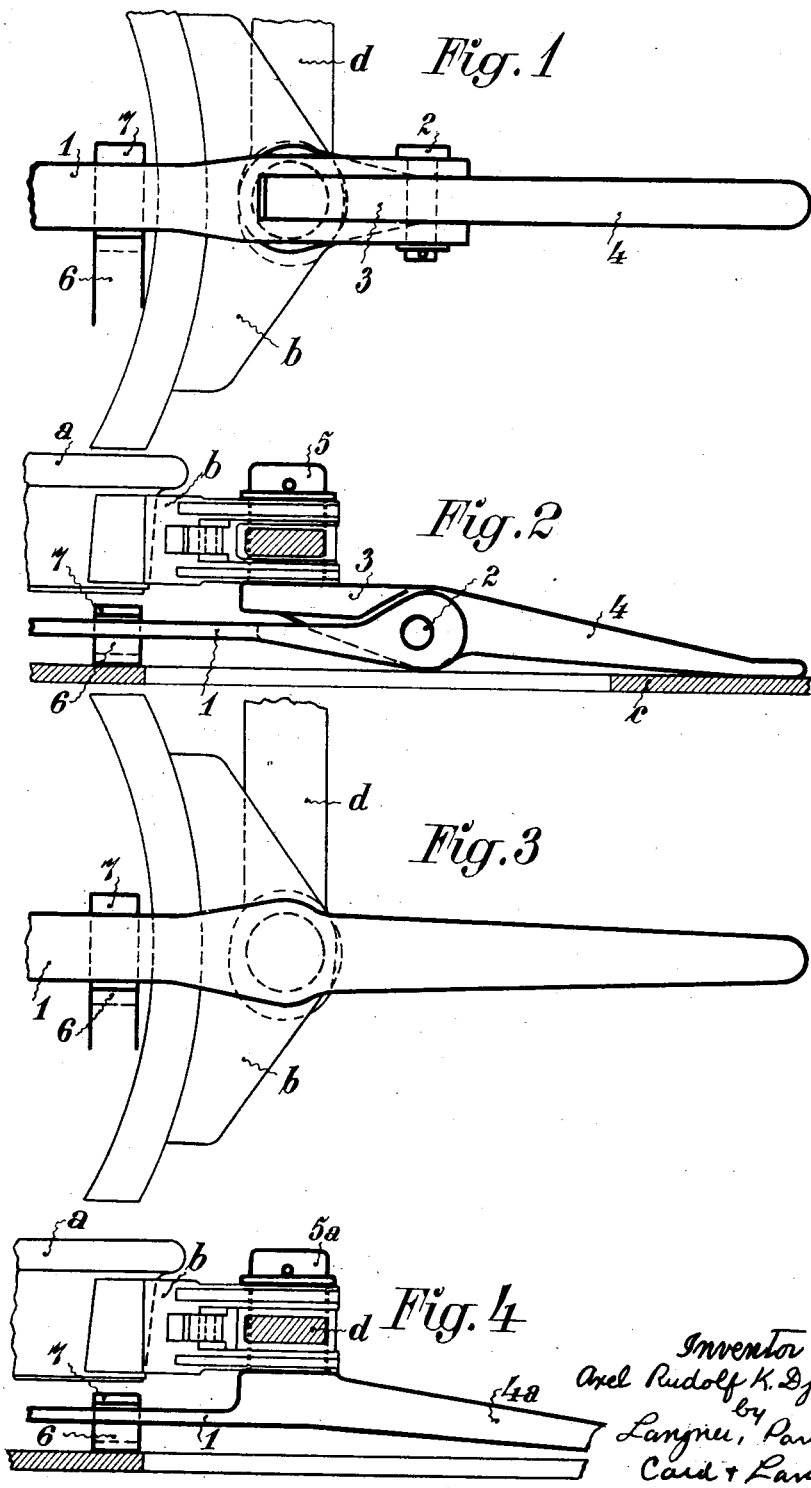

Patented Aug. 13, 1929.

1,724,795

UNITED STATES PATENT OFFICE.

AXEL RUDOLF KONRAD DJURSON, OF MALMO, SWEDEN, ASSIGNOR TO SVENSKA AKTIEBOLAGET BROMSREGULATOR, OF MALMO, SWEDEN, A CORPORATION OF SWEDEN.

GUIDING MEANS FOR BRAKE SHOES.

Application filed August 15, 1928, Serial No. 299,749, and in Germany October 8, 1927.

In vehicles adapted to be run on rails, i. e. railway cars and the like, in certain cases, due to lack of sufficient space, it will be impossible to provide the ordinary brake rigging having vertical brake levers placed in the longitudinal axis of the vehicle. In such cases it will frequently be necessary to provide a brake lever arrangement at each of the wheels to be braked, such lever arrangement being positioned in a plane located on the one side of the plane of movement of the brake shoes.

The present invention refers to an improvement in brake riggings of this kind and has for its object to provide means for the transfer of the braking power to the shoes, so that the latter are permitted to move in a lateral direction parallel to the wheel shafts, such power giving rise to a moment of torsion between the plane in which the power is transmitted and that in which the brake shoes move, and such moment of torsion freely acting upon the shoes being wholly or in part utilized for the purpose of counteracting the tendency of the shoes at the braking to move outwardly on the wheels on account of the conical shape of the same. By a suitable construction of the member transmitting the braking power to the shoes such moment of torsion can be given so great a value, that it will not only counteract the tendency of the shoes to slide outwardly but also give them a tendency to slide inwardly. Therefore the brake shoes have a tendency to be permanently pressed inwardly, so that the inner edge of the same is in contact with the respective wheel flanges, even if, for instance when running the vehicle on curves or the like, the wheels are axially displaced transversely to the underframe of the vehicle supporting the brake rigging.

A couple of different embodiments of the invention are illustrated in the accompanying drawing, wherein Fig. 1 shows an elevation of one of such embodiments, Fig. 2 showing the same seen from above. Fig. 3 shows an elevation of the second embodiment, and Fig. 4 is a plan view of the latter.

The parts of construction shown in heavy lines form the invention, the parts shown in thin lines are included merely for the sake of clearness and do not belong to the same.

In the drawing the vehicle wheel $a$ (shown in part only) is to be acted upon by the brake shoe $b$ supported by the link $d$, a part of the underframing of the vehicle being shown at $c$.

The pull rod, by means of which the shoe $b$ is pressed towards the wheel $a$, is shown at 1, and the constructional parts coacting with said rod for exerting the braking tension in the same are independent of the invention and can be carried out according to will.

According to the embodiment of invention shown in Figs. 1 and 2 the end of the pull rod 1 is shaped into a bearing for a bolt 2 forming the pivot for a two-armed lever 3, 4, the arm 3 of which is directed towards the wheel and provided with a transverse pin 5 on which the brake shoe $b$ is pivotally mounted. The other lever arm 4 forms a support resting against the inner side of the framing part $c$ positioned on the outer side of the construction as a whole.

With regard to its manner of action the embodiment shown in Figs. 3 and 4 corresponds entirely with the embodiment according to Figs. 1 and 2. In this case, however, the pull rod 1 is rigidly connected with the pin $5^a$ pivotally supporting the brake shoe $b$, and besides it is provided with an extension so as to form a supporting arm $4^a$ rigidly connected with the rod, such arm resting against the framing part $c$ in similar manner as the arm 4 of the lever 3, 4 according to embodiment first described.

In both of the embodiments the pull rod 1 is guided by an angular guiding member 6 affixed to the underframing of the vehicle, for instance to the part $c$ thereof, such member at the side facing the wheel being provided with an abutment 7. The amount of play or clearance within said guiding member is given a value so as to permit a transversal displacement of the pull rod 1 within certain limits determined inwardly by said abutment 7. From reasons to be apparent from the following the displacement in the outward direction needs no limitation, but it will be obvious that the limit in the latter direction will be determined by that part of the under framing supporting the angular guiding member.

With regard to both of the embodiments described the manner of action is the same, i. e. the following:—

The tension arising in the pull rod 1 when applying the brakes is exerted in a plane on the one side of that, in which the brake shoe moves. On account thereof a moment of torsion is established between the said two planes, the forces counteracting such moment of torsion being the contact pressure between the supporting arm 4 or 4ᵃ and the frame member c together with that component of the braking power tending to displace the brake shoe outwardly on the conical surface of the wheel. Since now the point of contact of the supporting arm 4 or 4ᵃ is fixed in the direction of the moment of torsion, the latter, apart from the arising resistance counteracting such movement, will cause the brake shoe to be displaced inwardly, and since said resistance is known or may be calculated, the length of the lever arms may be chosen in a manner as well for counterbalancing the forces tending to displace the brake shoe outwardly as also for transmitting to the brake shoe a force displacing the same inwardly, the latter manner of action being preferable with regard to the margin of safety obtained thereby. Therefore, when applying the invention in practice, it is advisable that the leverage is chosen in such a manner that the brake shoe by the influence of the braking power applied to the pull rod 1 is displaced inwardly towards the wheel flange, and then it is the object of the abutment 7 to form a limit for such displacement.

What I claim and desire to secure by Letters Patent is:—

1. Improvement in guiding means for brake shoes on vehicles running on rails comprising a brake shoe reciprocable in relation to the wheel, supporting means for said brake shoe and means for transmitting the braking power to said shoe in a plane located on the one side of the plane of movement of the shoe, such power transmitting means being arranged in a manner so that the moment of torsion arising between the two planes mentioned at least in part is utilized as a counteracting force against the tendency of the brake shoe to be displaced outwardly on the conical tread surface of the wheel when braking.

2. Improvement in guiding means for brake shoes on vehicles running on rails comprising a brake shoe reciprocable in relation to the wheel, supporting means for said brake shoe and means for transmitting the braking power to said shoe in a plane located on the one side of the plane of movement of the shoe, such power transmitting means being arranged in a manner so that the moment of torsion arising between the two planes mentioned is utilized not only for counteraction of the tendency of the brake shoe to be displaced outwardly on the conical tread surface of the wheel when braking but also for performing an inward displacement of the same towards the wheel flange, an abutment being arranged for limitation of said last mentioned displacement.

3. Improvement in guiding means for brake shoes on vehicles running on rails comprising a brake shoe reciprocable in relation to the wheel, a supporting arm positioned in inclination to the plane of the wheel, one end of said arm carrying the brake shoe the opposite end resting in contact with a fixed surface, and means for applying the braking power at a point between the ends of the said arm in a manner so as to give rise to a moment of torsion tending to displace the brake shoe inwardly towards the wheel flange.

4. Improvement in guiding means for brake shoes on vehicles running on rails comprising a brake shoe reciprocable in relation to the wheel, a supporting arm positioned in an outward inclination in relation to the plane of the wheel, a pivot pin arranged at the inner end of said arm and carrying the brake shoe, a fixed surface positioned at the outer end of said arm and forming an abutment for the same and means for applying the braking power to said arm at a point between the ends thereof.

5. Improvement in guiding means for brake shoes on vehicles running on rails comprising a brake shoe reciprocable in relation to the wheel, a supporting arm positioned in an outward inclination in relation to the plane of the wheel, a pivot pin arranged at the inner end of said arm and carrying the brake shoe, a fixed surface positioned at the outer end of said arm and forming an abutment for the same and a member for transmitting the braking power to the supporting arm at a point between its ends, such member being pivotally connected with said arm.

In testimony whereof I have signed my name to this specification.

AXEL RUDOLF KONRAD DJURSON.